US012204145B2

(12) United States Patent
Midolo et al.

(10) Patent No.: US 12,204,145 B2
(45) Date of Patent: Jan. 21, 2025

(54) SINGLE-PHOTON OPTICAL DEVICE (71) Applicant: KØBENHAVNS UNIVERSITET, Copenhagen K (DK)

(72) Inventors: Leonardo Midolo, Copenhagen Sv (DK); Peter Lodahl, Birkerød (DK); Ravitej Uppu, Copenhagen (DK); Henri Thyrrestrup Nielsen, Copenhagen Sv (DK)

(73) Assignee: KØBENHAVNS UNIVERSITET, Copenhagen K (DK)

( * ) Notice: Subject to any disclaimer, the term of this patent is extended or adjusted under 35 U.S.C. 154(b) by 188 days.

(21) Appl. No.: 17/785,532

(22) PCT Filed: Dec. 18, 2020

(86) PCT No.: PCT/EP2020/087164
§ 371 (c)(1),
(2) Date: Jun. 15, 2022

(87) PCT Pub. No.: WO2021/123264
PCT Pub. Date: Jun. 24, 2021

(65) Prior Publication Data
US 2023/0024502 A1    Jan. 26, 2023

(30) Foreign Application Priority Data

Dec. 19, 2019 (EP) .................................... 19218224

(51) Int. Cl.
*G02B 6/122* (2006.01)
*G02B 6/26* (2006.01)
(Continued)

(52) U.S. Cl.
CPC .............. *G02B 6/122* (2013.01); *G02B 6/26* (2013.01); *G02B 6/29305* (2013.01); *G02B 6/29368* (2013.01); *G02B 6/4246* (2013.01)

(58) Field of Classification Search
CPC .... G02B 6/0229; G02B 6/122; G02B 6/1225; G02B 6/26
See application file for complete search history.

(56) References Cited

U.S. PATENT DOCUMENTS 7,539,373 B1    5/2009  Logvin et al.
2017/0160474 A1*  6/2017  Mahmoodian ..... G02B 6/02061
(Continued)

OTHER PUBLICATIONS

Peter Lodahl et al, "Interfacing single photons and single quantum dots with photonic nanostructures", doi:10.1103/RevModPhys.87.347, (Dec. 4, 2013), URL: http://arxiv.org/abs/1312.1079, XP055158721, (Dec. 2013).

*Primary Examiner* — Michael Stahl
(74) *Attorney, Agent, or Firm* — DUANE MORRIS LLP; Gregory M. Lefkowitz; Joaquin Hernandez (57) ABSTRACT

This disclosure relates to an optical device comprising: a first filter waveguide section having an input for receiving a pump signal, the first filter waveguide section further having an output; an emitter waveguide section having an input coupled to the output of the first filter waveguide section to receive a transmitted pump signal therefrom, the emitter waveguide section supporting at least a first guided lower-order optical mode and a second guided higher-order optical mode, the emitter waveguide section comprising a photon emitter coupled to the first guided mode to emit radiation into the first guided mode and coupled to the second guided mode to allow optical pumping of the photon emitter by pump signal power carried in the second guided mode, the emitter waveguide section further having an output for outputting radiation emitted from the photon emitter; a second filter waveguide section having an input coupled to the output of the emitter waveguide section and having an output, the second filter waveguide section being configured to transmit radiation emitted into the first guided mode with (Continued)

lower loss than radiation emitted into modes other than the first guided mode; the first filter waveguide section being configured to couple pump signal power predominantly into the second guided mode of the emitter section.

22 Claims, 4 Drawing Sheets

(51) Int. Cl.
*G02B 6/293* (2006.01)
*G02B 6/42* (2006.01)

(56) References Cited

U.S. PATENT DOCUMENTS

2020/0396006 A1* 12/2020 Davanco ............ G02B 6/29337
2023/0012476 A1* 1/2023 Fertig ..................... G02F 1/365

* cited by examiner

SINGLE-PHOTON OPTICAL DEVICE

CROSS-REFERENCE TO RELATED APPLICATIONS

This application is a § 371 national stage entry of International Application No. PCT/EP2020/087164, filed Dec. 18, 2020, which claims priority to European Patent Application No. 19218224.4, filed Dec. 19, 2019, the entire contents of which are incorporated herein by reference.

FIELD OF THE INVENTION

The present invention relates to generation of single photons, for instance for use in quantum-information processing.

BACKGROUND OF THE INVENTION

Quantum mechanics was developed as an abstract theory of particles and fields, but it is now understood that it also constitutes the foundation for a novel type of technology, where quantum particles are used as carriers of information. Many applications have been envisioned, including quantum simulation, quantum key distribution, quantum repeaters, and a full-fledged quantum internet. Optical quantum technology is currently undergoing a revolution due to progress in semiconductor nanotechnology, which allows studying hitherto unseen quantum phenomena and renders the production of commercial optical quantum technology viable.

Data on everyday computers are comprised of bits, which are a binary sequence of zeroes and ones. These bits can be stored magnetically on hard drives or electrically on flash drives. In the last few decades quantum information processing using quantum bits or "qubits" has emerged as a completely new form of computation and as previously mentioned carriers of information. Unlike a bit, a single qubit is a quantum mechanical object and can be in a combination or superposition of zero and one states. Qubits can be manipulated and processed to perform computational tasks.

Two common ways to represent a qubit include: using the quantized angular momentum, or spin, of a charged particle, e.g. spin up=0 and spin down=1, or by using photons, e.g. one photon in one particular optical mode=0, while one photon present in a different optical mode=1.

The fundamental resource for photonic quantum technology is a single particle of light, i.e. a photon. However, efficiently generating and controlling single photons are challenging tasks. Photonic nanostructures, such as photonic crystals, are particularly useful for this purpose and remarkable progress has been reached over the past decades. A key goal is to deterministically generate coherent single photons on demand. Semiconductor quantum dots (QDs) are excellent sources of coherent single photons and when embedded inside nanophotonic structures, near-unity photon-emitter coupling can be achieved.

Many prior art systems using quantum light sources, such as quantum dots, suffer from a low coupling efficiency. In order to commercialise photonic devices capable of generating or otherwise processing single photons, it is crucial that the coupling efficiency of the single photons from a single-photon emitter and into for instance an optical fibre is as high as possible and preferably near unity.

Furthermore, prior art systems are generally challenging from a mechanical point of view. Coupling of photons in and out of the single-photon devices is not done in a robust manner, which means that the single-photon devices are not sufficiently reliable for commercial use. The task of coupling several such sources together for advanced applications seems a tremendous challenge.

U.S. Pat. No. 7,539,373 B1 discloses an integrated lateral mode converter for converting a higher-order mode from a multi-mode laser into a fundamental mode suitable for in instance for communication systems that employ single-mode fibre.

In "Interfacing single photons and single quantum dots with photonic nanostructures" (Rev. Mod. Phys 87, 347), Lodahl et al. disclose a single-photon source that relies on emission from a quantum dot located in a waveguide that supports a fundamental mode. A photonic crystal ensures that single photons are emitted from one end of the waveguide only.

Accordingly, it is seen that there is a need for single-photon devices that, with a high efficiency and in a mechanically stable manner, can produce coherent single photons. There is also a need for devices that in a mechanically stable manner can produce coherent single photons and output them for instance in an optical fibre.

SUMMARY OF THE INVENTION

It is an object of the invention to provide a solution that overcomes or ameliorates at least one of the disadvantages of the prior art or is an alternative to prior art solutions.

In a first aspect, the invention provides an optical device comprising:
- a first filter waveguide section having an input for receiving a pump signal, the first filter waveguide section further having an output,
- an emitter waveguide section having an input coupled to the output of the first filter waveguide section to receive a transmitted pump signal therefrom, the emitter waveguide section supporting at least a first guided lower-order optical mode and a second guided higher-order optical mode, the emitter waveguide section further comprising a photon emitter coupled to the first guided mode to emit radiation into the first guided mode and coupled to the second guided mode to allow optical pumping of the photon emitter by pump signal power carried in the second guided mode, the emitter waveguide section further having an output for outputting radiation emitted from the photon emitter,
- a second filter waveguide section having an input coupled to the output of the emitter waveguide section and having an output, the second filter waveguide section being configured to transmit radiation emitted into the first guided mode with lower loss than radiation emitted into modes other than the first guided mode,
- the first filter waveguide section being configured to couple pump signal power predominantly into the second guided mode of the emitter section.

Such a device allows for highly efficient generation of indistinguishable single photons based on a pump signal. The device provides the pump signal in the waveguide and thus overcomes the complicated setup of prior art single-photon devices that rely on photon emitter pumping via leaky modes, while at the same time providing a more efficient out-coupling compared to prior art single-photon devices that deliver single photons out-of-plane via nano-structures that are very difficult to align with e.g. an optical fibre. In both types of prior art devices, stability is a major issue that, at least at present, has yet to be overcome.

In some embodiments of the present invention, the first guided mode is a fundamental mode of the emitter waveguide section, and the second guided mode is a first-order mode or a second-order mode of the emitter waveguide section.

In some embodiments, the first filter waveguide section is configured to suppress transmission of pump signal power into the first guided mode of the emitter waveguide section while allowing transmission of pump signal power into the second guided mode of the emitter waveguide section. This is an unusual configuration and thus requires a specially designed waveguide. In some embodiments, this is achieved using a first filter waveguide section that comprises a photonic crystal structure configured to suppress transmission of pump signal power into the first guided mode of the emitter waveguide section while allowing transmission of pump signal power into the second guided mode of the emitter waveguide section. In another formulation, the first filter waveguide section supports the second guided mode but not the first guided mode, or at least provides a higher loss for incoming radiation in the first guided mode relative to the second guided mode. Using such a photonic crystal structure may have the added benefit that single photons emitted in a direction back towards the first filter waveguide section are reflected, which means that such single photons are not lost. According to some embodiments, the photonic crystal structure is configured to reflect radiation coming from the emitter waveguide section in the first guided mode.

In some embodiments, the second filter waveguide section comprises one or more tapers configured to cause power carried in modes other than the first guided mode, but not power carried in the first guided mode, to leak; or at least a loss is higher for power carried in modes other than the first guided mode compared to power carried in the first guided mode. This allows for filtering out both a residual pump signal, which is carried in the second guided mode, and radiation emitted into the second guided mode by the photon emitter in the emitter waveguide section.

In some embodiments, the second filter waveguide section comprises one or more bends configured to cause power carried in modes other than the first guided mode, but not power carried in the first guided mode, to leak; or at least a loss is higher for power carried in modes other than the first guided mode compared to power carried in the first guided mode. This allows for filtering out both a residual pump signal, which is carried in the second guided mode, and radiation emitted into the second guided mode by the photon emitter in the emitter waveguide section.

As is understood by the person skilled in the art, "leak" refers to the process where a guided mode couples to so-called radiation modes or "leaky" modes, which are modes that radiate power out of the waveguide into the surroundings, such as into air surrounding the waveguide. By coupling the second guided mode to radiation modes, power carried in the second guided mode is shed along the second filter waveguide section.

It is also important to note that in case where a waveguide cross section changes, the optical modes change as well, including the guided modes, the number and/or profile of which may change. Thus, the first guided mode and the second guided mode that exist in the emitter waveguide section may not even exist for instance in the second filter waveguide section or at least a part of it. Instead, power carried in the first and second guided modes in the emitter waveguide section is, in case the mode profiles change, transferred to other modes, including non-guided modes, when the signals propagate along the waveguides. This is well-known to the person skilled in the art, and thus the concept of carrying power in various modes and the concept of power being transferred between modes when the waveguide profile changes (e.g. width, thickness, cross sectional shape, material composition, bending, etc.) will not be explained in further detail.

In some embodiments, the photon emitter is a quantum-confined structure. In some embodiments, the photon emitter is a quantum dot, such as a self-assembled quantum dot.

In some embodiments, the quantum dot has a size in the range 10-100 nm, such as an in-plane size in the range of 10-100 nm. The height may for instance be in the range 1-10 nm.

In some embodiments, the photon emitter is situated away from a symmetry axis of the emitter waveguide section, if there is one (which is usually, but not necessarily, the case). As an example, if the emitter waveguide section is a straight, rectangular waveguide, the photon emitter may be located off the centreline of the emitter waveguide section. In such a waveguide, a higher-order mode may have a node at the centre of the waveguide, and thus pump signal power carried in the higher-order mode is not coupled to a photon emitter located at the centreline. This could mean that the pump signal cannot cause creation of an exciton in the photon emitter, and as a result, it is not possible to control emission of single photons from the photon emitter. Accordingly, in some cases this feature is a requirement, while in some cases it is not. In some embodiments, the quantum dot is offset from the symmetry axis by between 2% and 25% of a width of the emitter waveguide section, such as between 2% and 15%, such as between 5% and 10%.

In some embodiments, the input of the first filter waveguide section is coupled to an input coupler. This may for instance be an input grating coupler configured to receive the pump signal. Such a grating coupler may improve the efficiency with which the pump signal is coupled into the first filter waveguide section, for instance from air.

The grating coupler may for instance comprise a first-order or second-order Bragg grating with respect to the pump signal wavelength.

In some embodiments, the grating coupler comprises a series of individual grooves, wherein the grooves and/or distances between individual grooves are adapted to provide efficient coupling of the pump signal into the first filter waveguide section. Such grooves may for instance be made by etching or otherwise removing material from a surface part of the device. Alternatively, material can be added in order to create the grating.

A longitudinal extent of the output grating may for instance be in the range 1.0-20 micrometers. The longitudinal extent may for instance substantially correspond to that of the core diameter of a single-mode optical fibre, such as in the range from 1-10 micrometres.

A grating period of the grating coupler may for instance be in the range 100-1000 nm, or 200-750 nm, or 300-500 nm. In some embodiments, the grating comprises substantially concentric grooves (and corresponding ridges). In some embodiments, the grating is apodized to reduce or eliminate back scattering into the second filter waveguide section.

As another example, the input coupler could be a spot-size converter.

In some embodiments, the second filter waveguide section output is coupled to an output coupler configured to couple single photons out of the optical device. This may for instance be an output grating coupler. An output coupler may improve the efficiency with which single photons generated in the emitter waveguide section are coupled out of the second filter waveguide section, for instance into an optical fibre or other waveguide.

In some embodiments, the output grating coupler comprises a series of individual grooves, wherein the grooves and/or distances between individual grooves are adapted to provide efficient coupling of single photons out of the second filter waveguide section. The grooves may for instance be made by etching or otherwise removing material from a surface part of the device. Alternatively, material can be added in order to create the grating.

As another example, the output coupler could be a spot-size converter.

The considerations described in relation to the input coupler, type, sizes, geometry, wavelengths, etc., also apply to the output coupler.

In some embodiments, the input coupler has essentially the same optical properties as the output coupler. In some embodiments, this is achieved by using the same geometry for both couplers, be it gratings couplers, spot-size converters, or another type of coupler.

In some embodiments, the optical device comprises an input fibre for receiving the pump signal and for coupling the received pump signal into the first filter section. Additionally, or alternatively, the optical device comprises an output fibre for coupling single photons generated in the emitter waveguide section out of the optical device. By providing an input fibre and an output fibre as part of the device, the device becomes easier to handle without compromising its mechanical stability.

In some embodiments, the coupling in and/or out using respective fibres is performed via respective input/output couplers, such as those described above.

In some embodiments, the device is packaged, preferably in such a way that the first filter waveguide section, the emitter waveguide section, and the second filter waveguide section are not exposed. Preferably, the package also includes an input fibre and/or an output fibre, such as those described above, accessible respectively for providing a pump signal into the device to generate single photons and to couple generated single photons out of the device.

Even without packaging, the optical device is close to "plug-and-play" due to its inherent robustness. By incorporating input and output fibres, several devices can be deployed in a complex yet very robust system. Packaged devices with an input fibre and an output fibre are, in a sense, plug-and-play devices, as they can be arranged and interconnected in a very robust manner.

In some embodiments, at least the first filter waveguide section and the emitter waveguide section are monolithically integrated. Monolithic integration provides more stable and robust devices.

In some embodiments, at least the emitter waveguide section and at least an initial part of the second filter waveguide section are monolithically integrated.

In some embodiments, the first filter waveguide section, the emitter waveguide section, and the second filter waveguide section, or at least an initial part of the second filter waveguide section, are monolithically integrated.

Generally, monolithic integration can be achieved by forming the sections in the same object, such as a III-V semiconductor crystal, for instance manufactured by molecular-beam epitaxy.

The waveguide sections are preferably contiguous waveguides without air/material interfaces along the direction of propagation (except in part or parts that may comprise a photonic crystal). Such interfaces cause reflections, which will negatively impact device performance. In some embodiments, a shape of one or more of the sections is either uniform or changes smoothly, for instance via a tapering or widening (one or more times). Preferably, tapering or widening is adiabatic.

In some embodiments, one or more of the waveguide sections are based on one or more III-V semiconductor materials, such as In and/or Ga and/or Al and/or As, or other group III or group V material.

In some embodiments, the photon emitter is based on one or more III-V semiconductor materials, including In and/or Ga and/or Al and/or As, such as InGaAs, or other group III or group V material.

In some embodiments, the device employs II-VI semiconductor materials or group IV materials, such as carbon (C), for instance C in diamond crystal form.

In some embodiments, the optical device is configured to provide single photons at a wavelength in the range 400 nm-1600 nm.

A second aspect of the invention provides an optical system that comprises an optical device in accordance with an embodiment of the first aspect of the invention or the third aspect of the invention, as well as an optical pump source for providing the pump signal used for generating single photons in the emitter waveguide section.

In some embodiments, the optical system is configured to provide single photons at a wavelength in the range 400 nm-1600 nm.

In some embodiments, the pump signal is configured to resonantly excite the photon emitter. This provides a more efficient pumping of the photon emitter. More importantly, this may improve the indistinguishability of the generated single photons.

In this specification, the term nanostructure, where used, merely indicates, as is known in the art, that part of the structure in question has a characteristic dimension on the order of nanometers, or tens or hundreds of nanometers. It does not necessarily mean that the entire structure is limited to nanometer-size. As an example, a waveguide made of GaAs and having a square cross section with a side length of 200 nm is a nanostructure, even if the waveguide is much longer, such as tens of micrometers, as in some embodiments described below, or even millimetres long, or longer.

In some embodiments, one or more of the sections comprises a photonic crystal structure for controlling propagation of the pump signal and/or photons generated by the photon emitter, for instance as described in relation to the first filter waveguide section.

In some embodiments, a lattice constant a of the photonic crystal structure in the first filter waveguide section is in the interval 100-500 nm, such as in the interval 150-400 nm. The lattice constant depends on the wavelength of operation and the pattern of the photonic crystal lattice, including the relative size of the holes, as well as the dimensions of the photonic crystal waveguide (e.g. width and thickness) and the materials from which the photonic crystal waveguide is made. In some embodiments, the holes are substantially circularly shaped and have a radius of between 0.2a and 0.4a, e.g. around 0.3a.

In some embodiments, a width of one or more of the waveguide sections is in the range 100-1000 nm. The waveguides are generally dimensioned to support one of the working principles of the invention, that at least a lower-order guided mode and a higher-order guided mode are supported by the emitter waveguide section, that the pump signal is in the higher-order mode and not in lower-order mode (to the extent possible, i.e. at least predominantly in the higher-order mode), that the photon emitter is pumped using the higher-order mode and emits into the lower-order mode (at least preferentially into the lower-order mode), and that a filtering action is required after generation of single photons in order to preferentially output the single photons generated by the photon emitter while filtering away a residual pump signal.

In some embodiments, one or more of the waveguide sections are planar, such as a slab waveguide, ridge waveguide, a floating waveguide, such as a beam, such as a nanobeam. Such planar waveguide may advantageously have a thickness and/or width in the range of 50-500 nm, or 75-350 nm, or 100-250 nm.

In embodiments where one of the waveguides comprises a photonic crystal structure with a lattice constant a, a thickness of that waveguide may optionally be between 0.1a and 1a, such as between 0.2a and 0.8a, such as between 0.3a and 0.7a, e.g. around 0.5a or 0.6a.

A third aspect of the invention provides an optical device comprising:
- a first filter waveguide section having an input for receiving a pump signal with an optical component having a first frequency, the first filter waveguide section further having an output,
- an emitter waveguide section having an input coupled to the output of the first filter waveguide section to receive a transmitted part of the pump signal, the emitter waveguide section supporting at least a first guided lower-order optical mode and a second guided higher-order optical mode at the first frequency, the emitter waveguide section further comprising a photon emitter coupled to the first guided mode to emit radiation into the first guided mode and coupled to the second guided mode to allow optical pumping of the photon emitter by pump signal power carried in the second guided mode, the emitter waveguide section further having an output for outputting radiation emitted from the photon emitter,
- a second filter waveguide section having an input coupled to the output of the emitter waveguide section and having an output, the second filter waveguide section being configured to transmit radiation emitted into the first guided mode with lower loss than radiation emitted into modes other than the first guided mode,
- the first filter waveguide section being configured to couple the pump signal power predominantly into the second guided mode of the emitter section.

In some embodiments, the first frequency corresponds to a free-space wavelength in the range 400 nm-1600 nm (approximately 187.4 THz to 749.5 THz). The person skilled in the art will also recognize that the various additional features discussed in relation to the first aspect and the second aspect may also apply to the third aspect where compatible. Thus, these features will not be repeated here.

BRIEF DESCRIPTION OF THE DRAWINGS

The invention is explained in detail below with reference to the drawings.

DETAILED DESCRIPTION OF SELECTED EMBODIMENTS

The invention is described in the following with reference to the drawings. The drawings are not necessarily to scale, except if otherwise indicated.

Figure 1:
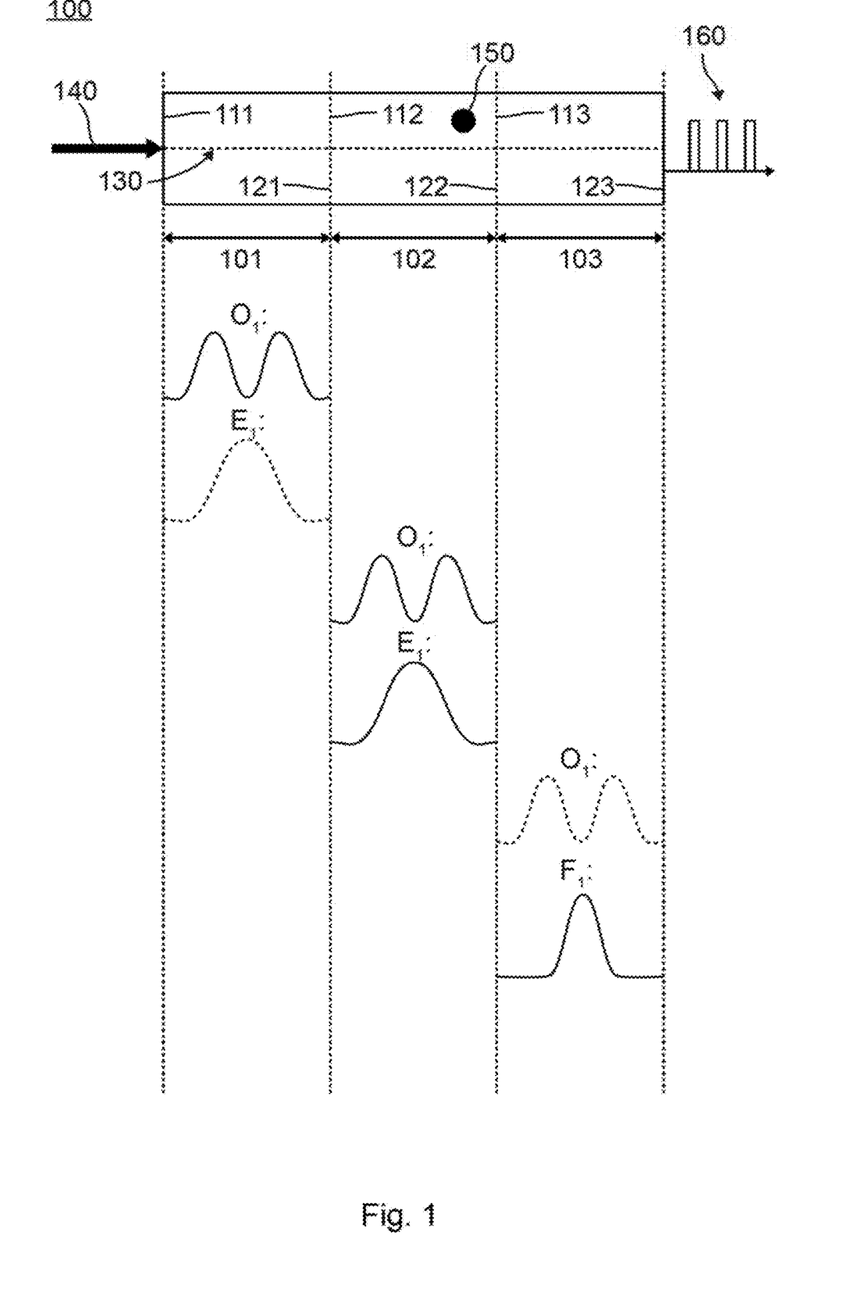
FIG. 1 illustrates schematically a single-photon optical device in accordance with an embodiment of the invention.

FIG. 1 schematically illustrates an optical device 100 for generating single photons 160 from a pump signal 140 (pulsed). The optical device 100 comprises a first filter waveguide section 101 having an input 111 and an output 121, an emitter waveguide section 102 having an input 112 and an output 122, and a second filter waveguide section 103 having an input 113 and an output 123. In the schematic illustration in FIG. 1, the first filter waveguide section 101, the emitter waveguide section 102, and the second filter waveguide section 103 are arranged in series, the output 121 of the first filter waveguide section 101 being coupled to the input 112 of the emitter waveguide section 102, the output 122 of the emitter waveguide section 102 being coupled to the input 113 of the second filter waveguide section 103. The pump signal 140 enters the first filtering waveguide section via input 111 of the first filter waveguide section, and the single photons are provided at the output 123 of the second filter waveguide section. The pump signal 140 and the single photons 160 are only schematically illustrated. Nothing shall be inferred from the drawing about the properties of the pump signal or the single photons, including any temporal width, amplitude, frequency, or otherwise.

The person skilled in the art will recognize that the "input" and "output" of the different sections 101, 102, 103 may be distinguishable or not. If the sections 101, 102, 103 are monolithically integrated, the inputs and outputs, in particular inputs 112 and 113, and the outputs, in particular outputs 121 and 122, may be virtual only, being defined by the function of the particular sections and not necessarily by a distinguishable structural property, such as an air gap or taper in the waveguide geometry.

The emitter waveguide section 102 comprises a photon emitter 150, such as a quantum dot.

The first filter waveguide section 101, the emitter waveguide section 102, and the second filter waveguide section 103 have waveguiding properties and preferably each supports one or more guided modes. At the quantum dot 150, the emitter section supports at least two modes, in particular at least a lower-order mode, such as a fundamental mode $E_1$, and a higher-order mode, such as a first-order mode $O_1$. The mode $E_1$ may be even or odd. It is preferable that $E_1$ is an even mode, preferably a fundamental mode of the emitter waveguide section. Similarly, mode $O_1$ may be even or odd. Preferably, it is a first-order mode of the emitter waveguide section. In the present example, the first filter waveguide section and the emitter waveguide section are shown as having a uniform and identical widths, which means that the emitter waveguide section supports virtually the same modes at the emitter waveguide section input 112, at the position of the quantum dot 150, and at the emitter waveguide section output 122. The emitter waveguide section may instead have a non-uniform width, in which case the mode profiles change along the waveguide.

In the present example, the quantum dot 150 is located off the centreline 130 of the (in this case symmetric) emitter waveguide section. Both guided modes $E_1$ and $O_1$ overlap with the quantum dot at this position. Radiation in the first-order mode $O_1$ can therefore excite the quantum dot 150, which in response emits one or more photons. The coupling of the first-order mode $O_1$ to the quantum dot is preferably relatively small and the coupling to the fundamental mode $E_1$ relatively high. This increases the degree to which photons are preferentially emitted into the mode $E_1$. Since the mode $O_1$ is used to excite the quantum dot, emission into the first-order mode from the quantum dot is unavoidable.

The modes in the different section 101, 102, 103 are schematically illustrated below the illustration of the optical device 100. As described above, the emitter waveguide section supports modes $E_1$ and $O_1$. In accordance with embodiments of the invention, the first filter waveguide section suppresses the mode $E_1$. Thus, below section 101, the mode $E_1$ is shown with a dashed line, indicating that it is not supported or at least experiences a high loss compared to mode $O_1$.

The second filter waveguide section, on the other hand, does not support $O_1$, but supports a mode $F_1$, which for the purpose of this example is the mode at the output 123 of the second filter waveguide section. $F_1$ is illustrated as having a different shape from that of the mode $E_1$. This may or may not be the case and is a matter of design, for instance dictated by requirements of the intended use of the device.

As described above, single photons are emitted into both mode $E_1$ and mode $O_1$, and they are mixed with residual pump signal power, carried mostly in mode $O_1$. To isolate the emitted single photons, the radiation from the emitter waveguide section is filtered so that only photons emitted by the photon emitter remain. It is important to suppress the coupling of pump signal from the first filter waveguide section into mode $E_1$ in the emitter waveguide section as much as possible, since any background pump signal in the mode $E_1$ affects the purity of the generated single photons.

Due to the mode structure in the second filter waveguide section described above and illustrated below the second filter waveguide section 103 in FIG. 1, residual pump signal and single-photon power emitted into mode $O_1$ in the emitter waveguide section is filtered out, while single-photon power emitted into the mode $E_1$ is transmitted in the second filter waveguide section.

In this way, the optical device 100 can create virtually pure single photons.

Figure 2A:
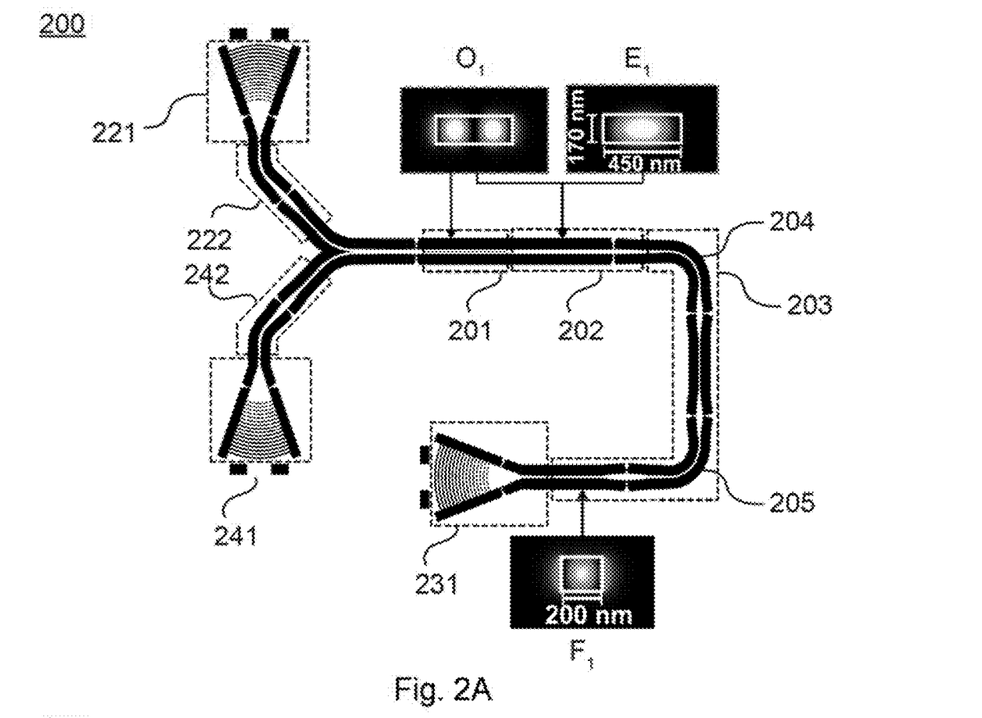
FIG. 2A illustrates a single-photon optical device in accordance with an embodiment of the invention.

FIG. 2A illustrates an optical device 200 for generating single photons. It comprises a first filter waveguide section 201, an emitter waveguide section 202, and a second filter waveguide section 203, similar to the schematic device 100 in FIG. 1, but with a geometry suitable for generating indistinguishable single photons. The layout 200 furthermore comprises a grating coupler 221 for receiving a pump signal, and a waveguide 222 for carrying the pump signal to the first filter waveguide section 201.

FIG. 2A furthermore shows a fundamental mode $E_1$ and a first-order mode $O_1$ for a nanobeam waveguide having a thickness of 170 nm and a width of 450 nm, as illustrated in the mode image for mode $E_1$. As shown, emitter waveguide section 202 supports both $E_1$ and $O_1$, whereas the photonic crystal part of first filter waveguide section 201 supports only $O_1$.

As discussed above, the division into sections can be performed in many ways without departing from the invention. For instance, the first filter waveguide section 201 in FIG. 2A could be "lengthened" to include a part that does not include holes, for instance a part of the emitter waveguide section 202 (but not the photon emitter), and accordingly the emitter waveguide section would be correspondingly shorter (as the input of the emitter waveguide section is coupled to the output of the first filter waveguide section). A part of the first filter waveguide section would then support both $E_1$ and $O_1$. However, the first filter waveguide section would still provide filtering away of $E_1$ as is the purpose of the first filter waveguide section. Thus, such an alternative division into sections would still be an embodiment of the invention. The important thing is that the device comprises sections capable of performing the respective functions.

Figure 2B:
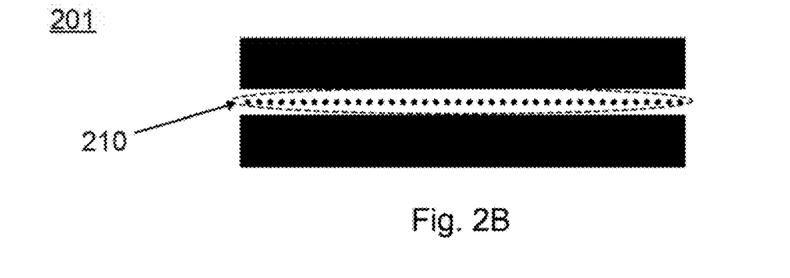
FIG. 2B illustrates a first filter waveguide section in more detail.

In FIG. 2A, the first filter waveguide section 201 comprises a photonic crystal structure 210, which supports only mode $O_1$ due to an array of holes. The first filter waveguide section is shown in more detail in FIG. 2B. The holes are made in a beam (nanobeam) waveguide having a width of 450 nm and a thickness of 170 nm, the same dimensions as the first filter waveguide section in FIGS. 2A and 3. Each of the 40 holes has a radius of 70 nm, and the hole-to-hole distance is 210 nm.

To produce single photons, a pump signal is provided at grating coupler 221. Between the grating coupler 221 and the first filter waveguide section 201, the pump signal is prepared in modes $E_1$ and $O_1$. Thus, after the waveguide 222, and just before the first filter waveguide section 201, pump signal power is carried in exactly those two guided modes. At the first filter waveguide section 201, the power carried in fundamental mode $E_1$ is filtered out (reflected, in fact), leaving only pump signal power carried in the first-order mode $O_1$.

In emitter waveguide section 202, a quantum dot (not visible in FIG. 2A) is pumped by the pump signal transmitted through the first filter waveguide section 201 in the first-order mode $O_1$. The pumping occurs via the coupling between the quantum dot and the first-order mode. In response, a photon is emitted, partly and mostly into the fundamental mode $E_1$, and partly into the first-order mode $O_1$. After the quantum dot, the first-order mode $O_1$ carries both residual pump power and single-photon radiation emitted into the first-order mode $O_1$. This radiation affects the purity of the emitted photon. Therefore, second filter waveguide section 203 is designed to remove power carried in the first-order mode $O_1$ in the emitter waveguide section. This is achieved in this example by including bends 204, 205 that cause the first-order mode $O_1$ to leak out (much more than the fundamental mode $E_1$). Tapering and widening sections as shown in FIG. 2A also cause the first-order mode $O_1$ power to be removed.

This leaves a single photon with high purity at the end of the second filter waveguide section 203, where it is shaped as illustrated by mode $F_1$. Here, the waveguide is a nanobeam having a width of 200 nm (as indicated in FIG. 2A) and a thickness of 170 nm.

Finally, a grating coupler 231 couples the single photon out of the optical device 200.

FIG. 2A also illustrates a further grating coupler 241, coupled to the first filter waveguide section 201 by a waveguide 242. This grating coupler, which can be employed generally in embodiments of the invention, not just the particular embodiment in FIG. 2A, is used to align a pump signal source (not shown) with the grating coupler 221. The pump signal is reflected by the photonic crystal structure in the first filter waveguide section 201, and the reflected signal is split by the Y-coupler. The coupling of pump signal power into the device is optimized by aligning the pump signal source such that the signal coupled out at grating coupler 241 is maximized.

Figure 3:
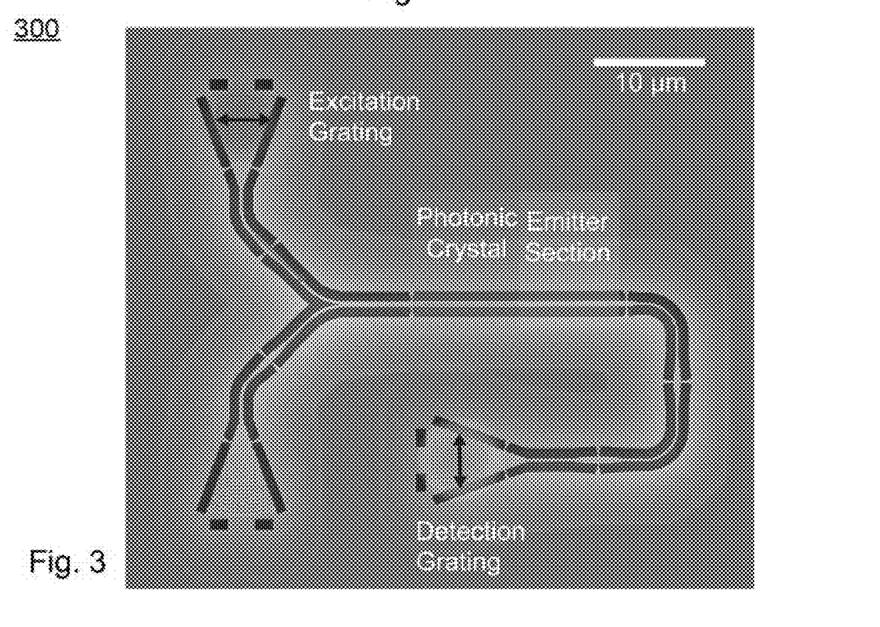
FIG. 3 shows a fabricated single-photon optical device based on a layout similar to that shown in FIG. 2A.

FIG. 3 illustrates an actual device 300 fabricated in accordance with a layout very similar to the optical device 200 shown in FIG. 2A. The black parts and the lighter areas surrounding the black parts are grooves created by etching. The lighter-shaded parts between the black grooves are suspended nanobeams. The grooves defining the grating coupler are also clearly visible.

In the following, the principle of the first filter waveguide section is described in more detail. As an example, a first filter waveguide section comprising a photonic crystal is designed using finite-element numerical calculations. It is designed to support two the two modes $E_1$ (fundamental mode) and $O_1$ (first-order mode). The first filter waveguide section in this example has a photonic crystal with 20 holes (whereas the optical device in FIG. 2A, the illustration of the first filter waveguide section 201 in FIG. 2B, and the device in FIG. 3 have holes).

Figure 4:
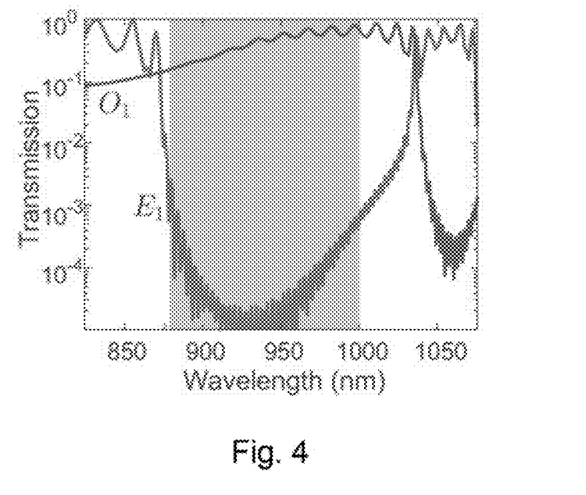
FIG. 4 shows a transmission spectrum of a first filter waveguide section comprising a photonic crystal structure.

The holes are made in a beam (nanobeam) waveguide having a width of 450 nm and a thickness of 170 nm, the same dimensions as the first filter waveguide section in FIGS. 2 and 3. Each of the 20 holes has a radius of 70 nm, and the hole-to-hole distance is 210 nm. FIG. 4 illustrates the transmission of the two modes across this photonic crystal. It can be seen that the photonic crystal provides a broad stop band with a >40-dB suppression of the fundamental mode $E_1$ in the range 920-960 nm. This high degree of suppression of the mode $E_1$ compared to the mode $O_1$ by the photonic crystal filter provides a way to prepare the pump signal selectively in the $O_1$ mode for coupling into the emitter waveguide section. This signal is subsequently used to pump the photon emitter in the emitter waveguide section. As described above, filtering out $E_1$ is very important, since there may not be a way to filter out pump signal power in mode $E_1$ once it reaches the emitter waveguide section, especially in embodiments where the pump signal is resonant with the photon emitter. In that case, the pump signal cannot be filtered out for instance using a spectral filter.

To improve the suppression of the fundamental mode even more, additional holes can be added, as illustrated in the device 200 in FIG. 2A and device 300 in FIG. 3.

In a simulation, the transmission of the first-order mode $O_1$ after the emitter section across the taper and the subsequent waveguide bends in the device 300 in FIG. 3 is estimated to be around $10^{-6}$-$10^{-7}$.

Figure 5:
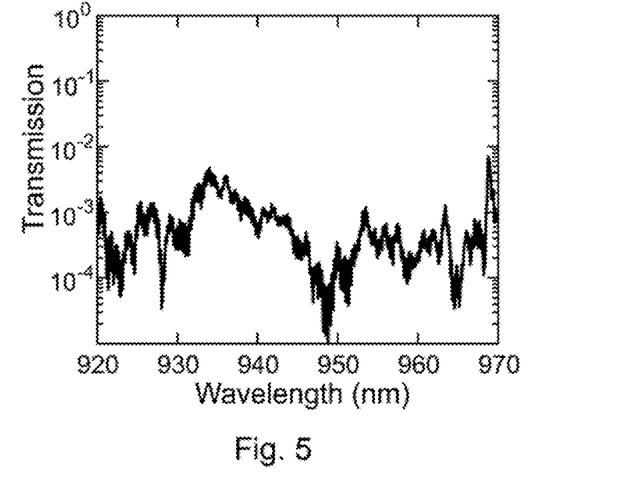
FIG. 5 shows a transmission spectrum illustrating the influence of having a first filter waveguide section that includes a photonic crystal structure.

The measured transmission Ti of the pump laser across the actual device 300 (see FIG. 3) is shown in FIG. 5. The transmission is normalized to a device without the photonic crystal in the first filter waveguide section, i.e. where the fundamental mode is not suppressed before the emitter waveguide section. It can be seen that the transmission fluctuates between $10^{-3}$ and $10^{-5}$ over the design range. Regions of minimum transmission where $T_l \sim 2 \cdot 10^{-5}$ are routinely observed across fabricated devices. Since the transmission levels match quite well the simulated transmission of $E_1$, it can be seen that the residual laser signal is caused entirely by leakage across the photonic crystal section. It is therefore a matter of design to suppress $E_1$.

An essential figure-of-merit of a resonantly excited quantum dot is the intensity of the residual pump signal relative to the intensity of emitted single photons. Here, this ratio is denoted $E_QD$ and indicates the number of laser photons per single photon. The single-photon purity at the collection grating is related to this quantity by $$g^{(2)}(0) = 2 \epsilon_{QD} - \epsilon_{QD}^2$$

where $g^{(2)}(\tau)$ is the second-order coherence function of the signal. The background laser intensity at the collection grating is given by $I_l T_l$, where $I_l$ is the input laser intensity and $T_l$ is the measured transmission shown in FIG. 5. Under pulsed-resonant excitation, the single-photon intensity at the collection grating is express as $I_{sp} = (I_l T_{in} \beta_{in}) \beta_{out}$, which holds under weak pumping of the quantum dot and when omitting any effect of dephasing. $\beta_{in}$ and $\beta_{out}$ are the photon β-factors that express the probability that the quantum dot absorbs a pump photon and emit a single photon into the waveguide, respectively. $T_{in}$ is the transmission efficiency of the $O_1$ mode through the photonic crystal waveguide (see FIG. 4), so that $I_l T_{in}$ represents the intensity of the pump at the quantum dot. Consequently, $$\epsilon_{QD} = \frac{I_l T_l}{I_{sp}} = \frac{1}{r_{QD} \beta_{in} \beta_{out}}$$

where $r_{QD} = T_{in}/T_l$ is the extinction ratio of the collection and the excitation modes that should be maximized for the optimum performance of the device.

Figure 6:
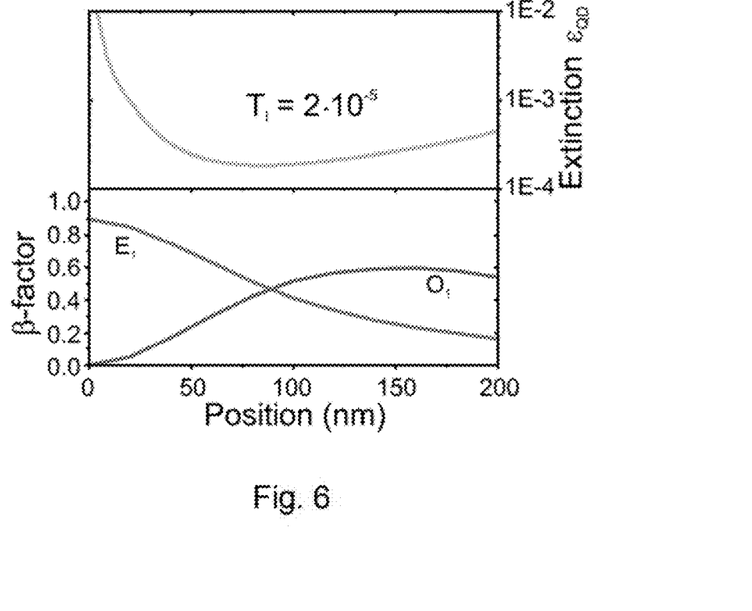
FIG. 6 shows a ratio between the number of residual laser photons per single photon emitted as a function of a position of the photon emitter.

The quantum dot position affects the value of $\epsilon_{QD}$, minimizing it whenever $\beta_{in} \simeq \beta_{out}$. Yet, if the device extinction ratio $r_{QD}$ is sufficiently large, $\beta_{out}$ can be increased. An example of a calculated figure of merit $\epsilon_{QD}$ is shown in FIG. 6, where $T_l = 2 \cdot 10^{-5}$ and $T_{in} = 5 \cdot 10^{-1}$ (average value from a simulation). For a quasi-centered quantum dot with $\beta_{out} \simeq 0.9$, a value $\epsilon_{QD} \simeq 5 \cdot 10^{-4}$ is obtained, indicating that a purity $g^{(2)}(\tau) \simeq 1 \cdot 10^{-3}$ is achieved. The extinction ratio $r_{QD}$ can be further enhanced, e.g. by improving the photonic crystal fabrication as such. This will lead to even better single-photon purity.

Figure 7:
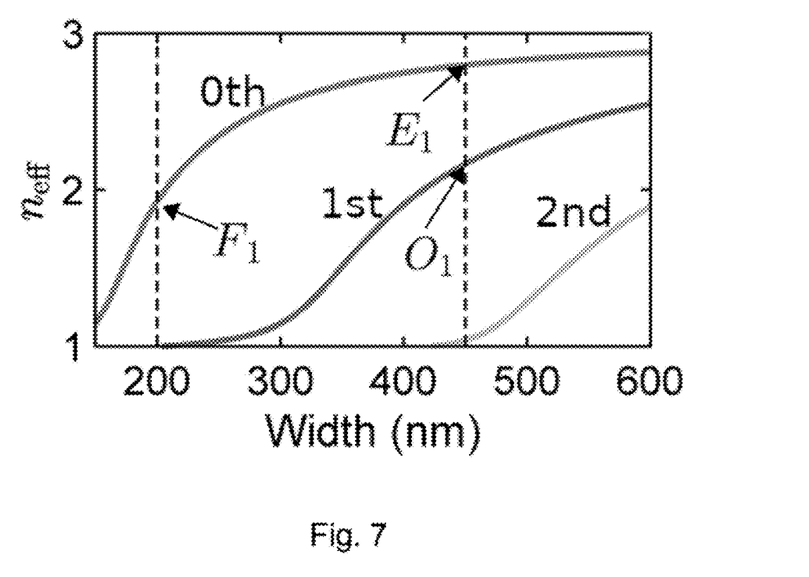
FIG. 7 shows schematically guided modes supported by an illustrative waveguide as a function of the width of the waveguide.

FIG. 7 illustrates guided modes in terms of effective refractive index as a function of waveguide width for the emitter waveguide section 202. As described in relation to FIG. 2A, the waveguide at the output of the second filter waveguide section 203 has a width of 200 nm and a thickness of 170 nm. As shown in FIG. 7, this waveguide shape supports only one mode, which is the fundamental ($0^{th}$-order) mode $F_1$ described above. Here, a $1^{st}$ order mode appears. With widening waveguide width, the fundamental mode becomes more tightly bound, and eventually an additional, $2^{nd}$ order mode, appears. At waveguide width 450 nm, the waveguide supports the fundamental mode $E_1$ shown in FIG. 2A, the first-order mode $O_1$ shown in FIG. 2A, and a very weakly bound $2^{nd}$ order mode. The waveguide in FIGS. 2A and 3 have a width of 450 nm in order to achieve a low loss for the fundamental and first-order modes. The second-order mode supported at a width of 450 nm has only a very small overlap with the photon emitter and thus will not affect the performance.

Various embodiments are defined in the following items:

1. An optical device (100, 200, 300) comprising:
    a first filter waveguide section (101, 201) having an input (111) for receiving a pump signal (140), the first filter waveguide section further having an output (121),
    an emitter waveguide section (102, 202) having an input (112) coupled to the output (121) of the first filter waveguide section (101, 201) to receive a transmitted pump signal therefrom, the emitter waveguide section supporting at least a first guided lower-order optical mode and a second guided higher-order optical mode, the emitter waveguide section further comprising a photon emitter (150) coupled to the first guided mode to emit radiation into the first guided mode and coupled to the second guided mode to allow optical pumping of the photon emitter by pump signal power carried in the second guided mode, the emitter waveguide section further having an output (122) for outputting radiation emitted from the photon emitter, a second filter waveguide section (103, 203) having an input (113) coupled to the output (122) of the emitter waveguide section (102, 202) and having an output (123), the second filter waveguide section being configured to transmit radiation emitted into the first guided mode with lower loss than radiation emitted into modes other than the first guided mode, the first filter waveguide section (101, 201) being configured to couple pump signal power predominantly into the second guided mode of the emitter section (102, 202).

2. An optical device in accordance with item 1, wherein the first guided mode is a fundamental mode of the emitter waveguide section and the second guided mode is a first-order mode or a second-order mode of the emitter waveguide section.

3. An optical device in accordance with item 1 or 2, wherein the first filter waveguide section is configured to suppress transmission of pump signal power into the first guided mode of the emitter waveguide section while allowing transmission of pump signal power into the second guided mode of the emitter waveguide section.

4. An optical device in accordance with any of the preceding items, wherein the first filter waveguide section (201) comprises a photonic crystal structure (210) configured to suppress transmission of pump signal power into the first guided mode of the emitter waveguide section while allowing transmission of pump signal power into the second guided mode of the emitter waveguide section.

5. An optical device in accordance with any of the preceding items, wherein the second filter waveguide section comprises:
one or more tapers configured to cause power carried in modes other than the first guided mode, but not power carried in the first guided mode, to leak; and/or
one or more bends configured to cause power carried in modes other than the first guided mode, but not power carried in the first guided mode, to leak.

6. An optical device in accordance with any of the preceding items, wherein the photon emitter (150) is a quantum-confined structure, such as a quantum dot.

7. An optical device in accordance with any of the preceding items, wherein the photon emitter is situated away from a symmetry axis (130) of the emitter waveguide section.

8. An optical device in accordance with any of the preceding items, wherein the input of the first filter waveguide section is coupled to a grating coupler (221) for receiving the pump signal, and the second filter waveguide section output is coupled to a grating coupler (231) for coupling radiation emitted by the photon emitter out of the optical device.

9. An optical device in accordance with any of the preceding items, further comprising:
an input fibre for receiving the pump signal and for coupling the received pump signal into the first filter section, and/or
an output fibre for coupling single photons generated in the emitter waveguide section out of the optical device.

10. An optical device in accordance with any of the preceding items, wherein the first filter waveguide section, the emitter waveguide section, and at least an initial part of the second filter waveguide section are monolithically integrated.

11. An optical device in accordance with any of the preceding items, wherein one or more of the waveguide sections are based on one or more III-V semiconductor materials, such as In and/or Ga and/or Al and/or As, or other group III or group V material.

12. An optical device in accordance with any of the preceding items, wherein the photon emitter is based on In and/or Ga and/or Al and/or As, such as InGaAs, or other group III or group V material.

13. An optical system comprising an optical device according to any of the preceding items and an optical pump signal source for providing the pump signal.

14. An optical device in accordance with any of items 1-12 or optical system in accordance with item 13, wherein the optical device or optical system is configured to provide single photons at a wavelength in the range 400 nm-1600 nm.

15. An optical device or optical system in accordance with any of items 1-14, wherein the pump signal is configured to resonantly excite the photon emitter.

LIST OF REFERENCE NUMERALS

| | |
|---|---|
| 100 | Optical device |
| 101, 201 | First filter waveguide section |
| 102, 202 | Emitter waveguide section |
| 103, 203 | Second filter waveguide section |
| 111, 112, 113 | Inputs |
| 121, 122, 123 | Outputs |
| 130 | Waveguide centreline |
| 140 | Pump signal |
| 150 | Photon emitter |
| 160 | Generated single photons |
| 200 | Optical device |
| 204, 205 | Bends |
| 210 | Photonic crystal structure |
| 221, 231, 241 | Grating couplers |
| 222, 242 | Grating coupler waveguides |
| 300 | Fabricated optical device |
| $E_1, O_1, F_1$ | Guided modes |

The invention claimed is:

1. An optical device comprising:
a first filter waveguide section having an input for receiving a pump signal, the first filter waveguide section further having an output,
an emitter waveguide section having an input coupled to the output of the first filter waveguide section to receive a transmitted pump signal therefrom, the emitter waveguide section supporting at least a first guided lower-order optical mode and a second guided higher-order optical mode, the emitter waveguide section further comprising a photon emitter coupled to the first guided lower-order optical mode to emit radiation into the first guided lower-order optical mode and coupled to the second guided higher-order optical mode to allow optical pumping of the photon emitter by pump signal power carried in the second guided higher-order optical mode, the emitter waveguide section further having an output for outputting radiation emitted from the photon emitter, a second filter waveguide section having an input coupled to the output of the emitter waveguide section and having an output, the second filter waveguide section being configured to transmit radiation emitted into the first guided lower-order optical mode with lower loss than radiation emitted into modes other than the first guided mode, and the first filter waveguide section being configured to couple pump signal power predominantly into the second guided higher-order optical mode of the emitter waveguide section, wherein the first filter waveguide section comprises a photonic crystal structure configured to suppress transmission of pump signal power into the first guided lower-order optical mode of the emitter waveguide section while allowing transmission of pump signal power into the second guided higher-order optical mode of the emitter waveguide section.

2. The optical of claim 1, wherein the first guided lower-order optical mode is a fundamental mode of the emitter waveguide section and the second guided higher-order optical mode is a first-order mode or a second-order mode of the emitter waveguide section.

3. The optical device of claim 1, wherein the first filter waveguide section is configured to suppress transmission of pump signal power into the first guided lower-order optical mode of the emitter waveguide section while allowing transmission of pump signal power into the second guided higher-order optical mode of the emitter waveguide section.

4. The optical device of claim 1, wherein the second filter waveguide section comprises at least one of:
one or more tapers configured to cause power carried in modes other than the first guided mode, but not power carried in the first guided mode, to leak; and
one or more bends configured to cause power carried in modes other than the first guided mode, but not power carried in the first guided mode, to leak.

5. The optical device of claim 1, wherein the photon emitter is a quantum-confined structure, such as a quantum det.

6. The optical device of claim 1, wherein the photon emitter is situated away from a symmetry axis of the emitter waveguide section.

7. The optical device of claim 1, wherein the input of the first filter waveguide section is coupled to a grating coupler for receiving the pump signal, and the second filter waveguide section output is coupled to a grating coupler for coupling radiation emitted by the photon emitter out of the optical device.

8. The optical device of claim 1, further comprising:
an input fibre for receiving the pump signal and for coupling the received pump signal into the first filter section, and/or
an output fibre for coupling single photons generated in the emitter waveguide section out of the optical device.

9. The optical device of claim 1, wherein the first filter waveguide section, the emitter waveguide section, and at least an initial part of the second filter waveguide section are monolithically integrated.

10. The optical device of claim 1, wherein one or more of the waveguide sections are based on one or more III-V semiconductor materials selected from the group consisting of In, Ga, Al, and As.

11. The optical device of claim 1, wherein the photon emitter is based on one or more of In, Ga, Al, As, or InGaAs.

12. The optical device of claim 1 further comprising an optical pump signal source for providing the pump signal.

13. The optical device of claim 1, wherein the optical device is configured to provide single photons at a wavelength in the range 400 nm-1600 nm.

14. The optical device of claim 1, wherein the pump signal is configured to resonantly excite the photon emitter.

15. The optical device of claim 1, wherein the input of the emitter waveguide section and the output of the first filter waveguide section are not separated by a gap.

16. The optical device of claim 1, wherein the output of the first filter waveguide section is indistinguishable from the input of the emitter waveguide section.

17. An optical device comprising:
a first filter waveguide section having an input for receiving a pump signal, the first filter waveguide section further having an output,
an emitter waveguide section having an input coupled to the output of the first filter waveguide section to receive a transmitted pump signal therefrom, the emitter waveguide section supporting at least a first guided lower-order optical mode and a second guided higher-order optical mode, the emitter waveguide section further comprising a photon emitter coupled to the first guided lower-order optical mode to emit radiation into the first guided lower-order optical mode and coupled to the second guided higher-order optical mode to allow optical pumping of the photon emitter by pump signal power carried in the second guided higher-order optical mode, the emitter waveguide section further having an output for outputting radiation emitted from the photon emitter,
a second filter waveguide section having an input coupled to the output of the emitter waveguide section and having an output, the second filter waveguide section being configured to transmit radiation emitted into the first guided lower-order optical mode with lower loss than radiation emitted into modes other than the first guided mode, and
the first filter waveguide section being configured to couple pump signal power predominantly into the second guided higher-order optical mode of the emitter waveguide section, wherein the input of the first filter waveguide section is coupled to a grating coupler for receiving the pump signal, and the second filter waveguide section output is coupled to a grating coupler for coupling radiation emitted by the photon emitter out of the optical device.

18. The optical device of claim 17, wherein the first filter waveguide section comprises a photonic crystal structure configured to suppress transmission of pump signal power into the first guided lower-order optical mode of the emitter waveguide section while allowing transmission of pump signal power into the second guided higher-order optical mode of the emitter waveguide section.

19. An optical device comprising:
a first filter waveguide section having an input for receiving a pump signal, the first filter waveguide section further having an output,
an emitter waveguide section having an input coupled to the output of the first filter waveguide section to receive a transmitted pump signal therefrom, the emitter waveguide section supporting at least a first guided lower-order optical mode and a second guided higher-order optical mode, the emitter waveguide section further comprising a photon emitter coupled to the first guided lower-order optical mode to emit radiation into the first guided lower-order optical mode and coupled to the second guided higher-order optical mode to allow optical pumping of the photon emitter by pump signal power carried in the second guided higher-order optical mode, the emitter waveguide section further having an output for outputting radiation emitted from the photon emitter, and a second filter waveguide section having an input coupled to the output of the emitter waveguide section and having an output, the second filter waveguide section being configured to transmit radiation emitted into the first guided lower-order optical mode with lower loss than radiation emitted into modes other than the first guided mode, and the first filter waveguide section being configured to couple pump signal power predominantly into the second guided higher-order optical mode of the emitter waveguide section, wherein the input of the emitter waveguide section and the output of the first filter waveguide section are not separated by a gap.

20. An optical device comprising:

a first filter waveguide section having an input for receiving a pump signal, the first filter waveguide section further having an output, an emitter waveguide section having an input coupled to the output of the first filter waveguide section to receive a transmitted pump signal therefrom, the emitter waveguide section supporting at least a first guided lower-order optical mode and a second guided higher-order optical mode, the emitter waveguide section further comprising a photon emitter coupled to the first guided lower-order optical mode to emit radiation into the first guided lower-order optical mode and coupled to the second guided higher-order optical mode to allow optical pumping of the photon emitter by pump signal power carried in the second guided higher-order optical mode, the emitter waveguide section further having an output for outputting radiation emitted from the photon emitter, and a second filter waveguide section having an input coupled to the output of the emitter waveguide section and having an output, the second filter waveguide section being configured to transmit radiation emitted into the first guided lower-order optical mode with lower loss than radiation emitted into modes other than the first guided mode, and the first filter waveguide section being configured to couple pump signal power predominantly into the second guided higher-order optical mode of the emitter waveguide section, wherein the output of the first filter waveguide section is indistinguishable from the input of the emitter waveguide section.

21. An optical device comprising:

a first filter waveguide section having an input for receiving a pump signal, the first filter waveguide section further having an output, an emitter waveguide section having an input coupled to the output of the first filter waveguide section to receive a transmitted pump signal therefrom, the emitter waveguide section supporting at least a first guided lower-order optical mode and a second guided higher-order optical mode, the emitter waveguide section further comprising a photon emitter coupled to the first guided lower-order optical mode to emit radiation into the first guided lower-order optical mode and coupled to the second guided higher-order optical mode to allow optical pumping of the photon emitter by pump signal power carried in the second guided higher-order optical mode, the emitter waveguide section further having an output for outputting radiation emitted from the photon emitter, and a second filter waveguide section having an input coupled to the output of the emitter waveguide section and having an output, the second filter waveguide section being configured to transmit radiation emitted into the first guided lower-order optical mode with lower loss than radiation emitted into modes other than the first guided mode, and the first filter waveguide section being configured to couple pump signal power predominantly into the second guided higher-order optical mode of the emitter waveguide section, wherein the second filter waveguide section comprises one or more bends configured to cause power carried in modes other than the first guided mode, but not power carried in the first guided mode, to leak.

22. An optical device comprising:

a first filter waveguide section having an input for receiving a pump signal, the first filter waveguide section further having an output, an emitter waveguide section having an input coupled to the output of the first filter waveguide section to receive a transmitted pump signal therefrom, the emitter waveguide section supporting at least a first guided lower-order optical mode and a second guided higher-order optical mode, the emitter waveguide section further comprising a photon emitter coupled to the first guided lower-order optical mode to emit radiation into the first guided lower-order optical mode and coupled to the second guided higher-order optical mode to allow optical pumping of the photon emitter by pump signal power carried in the second guided higher-order optical mode, the emitter waveguide section further having an output for outputting radiation emitted from the photon emitter, and a second filter waveguide section having an input coupled to the output of the emitter waveguide section and having an output, the second filter waveguide section being configured to transmit radiation emitted into the first guided lower-order optical mode with lower loss than radiation emitted into modes other than the first guided mode, and the first filter waveguide section being configured to couple pump signal power predominantly into the second guided higher-order optical mode of the emitter waveguide section, wherein the waveguide sections form a contiguous waveguide without air/material interfaces along a direction of propagation.

* * * * *